US007119327B2

(12) United States Patent
Spahn et al.

(10) Patent No.: US 7,119,327 B2
(45) Date of Patent: Oct. 10, 2006

(54) METHOD OF CORRECTING AN X-RAY IMAGE RECORDED BY A DIGITAL X-RAY DETECTOR AND CALIBRATING AN X-RAY DETECTOR

(75) Inventors: Martin Spahn, Erlangen (DE); Boris Stowasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 10/944,591

(22) Filed: Sep. 17, 2004

(65) Prior Publication Data

US 2005/0061963 A1 Mar. 24, 2005

(30) Foreign Application Priority Data

Sep. 19, 2003 (DE) ................................ 103 43 496

(51) Int. Cl.
*G01D 18/00* (2006.01)

(52) U.S. Cl. .................................................. 250/252.1

(58) Field of Classification Search .............. 250/252.1
See application file for complete search history.

(56) References Cited

U.S. PATENT DOCUMENTS 6,350,985 B1 * 2/2002 Rodricks et al. ......... 250/252.1
7,026,608 B1 * 4/2006 Hirai ....................... 250/252.1

OTHER PUBLICATIONS

M. Spahn, V. Heer, R. Freytag, “Flachbilddetektoren in der Röntgendiagnostik”, Der Radiologe, May 2003, pp. 340-350, Springer Publishing House, Forchheim.

* cited by examiner

*Primary Examiner*—David Porta
*Assistant Examiner*—Mindy Vu

(57) ABSTRACT

For the comparatively simple and precise correction of an X-ray image (RB) recorded by a digital X-ray detector (3) with comparatively little calibration, at least one gain image ($G^0$,$G^1$,$G^2$) is selected from a plurality of stored gain images (G) for linking to the X-ray image (R) based on at least one parameter ($P_i$) characterizing the recording conditions of the X-ray image (RB), whereby the gain images (G) are stored such that they differ at least in respect of one parameter ($P_i$) used for the selection and whereby the selection of the at least one gain image ($G^0$,$G^1$,$G^2$) is made based on the distance (d) between the parameter configuration (g0,g1,g2) of the gain image ($G^0$,$G^1$,$G^2$) and the parameter configuration (p) of the X-ray image (RB) in a parameter space (35) set by the parameters ($P_i$).

11 Claims, 2 Drawing Sheets

METHOD OF CORRECTING AN X-RAY IMAGE RECORDED BY A DIGITAL X-RAY DETECTOR AND CALIBRATING AN X-RAY DETECTOR

CROSS REFERENCE TO RELATED APPLICATIONS

This application claims priority to the German application No. 10343496.8, filed Sep. 19, 2003 and which is incorporated by reference herein in its entirety.

FIELD OF INVENTION

The invention relates to a method for correcting an X-ray image recorded by a digital X-ray detector. The invention also relates to an associated method for calibrating the X-ray detector and an associated X-ray device.

BACKGROUND OF INVENTION

Most of the imaging examination methods used in medical technology have been based on X-ray recordings for many years now. In recent years digital recording technologies have increasingly become established in place of conventional radiography based on photographic film. These technologies have the significant advantage that time-consuming film development is no longer required. Images tend instead to be produced by means of electronic image processing. The image is therefore available directly after recording. Digital X-ray recording technologies also offer the advantage of better image quality, possibilities for post-processing the images electronically and the option of dynamic examination, i.e. the recording of moving X-ray images.

The digital X-ray recording technologies used include so-called image-intensifier camera systems, based on television or CCD cameras, storage film systems with integrated or external readout units, systems with a converter film optically linked to CCD cameras or CMOS chips, selenium-based detectors with electrostatic readout systems and solid-state detectors with active readout arrays with direct or indirect X-ray radiation conversion.

Solid-state detectors in particular have been under development for digital X-ray imaging for several years now. Such a detector is based on an active readout array, e.g. of amorphous silicon (a-Si), behind an X-ray converter layer or scintillator layer, e.g. of cesium iodide (CsI). The incident X-ray radiation is first converted to visible light in the scintillator layer. The readout array is divided into a plurality of sensor surfaces in the form of photodiodes which in turn convert said light to electric charge and store it with local resolution. In the case of a so-called direction-conversion solid-state detector an active readout array of active silicon is also used. However this is arranged behind a converter layer, e.g. of selenium, in which the incident X-ray radiation is converted directly to electric charge. This charge is then in turn stored in a sensor surface of the readout array. For the technical background to a solid-state detector, also referred to as a surface image detector, see also M. Spahn et al., "Flachbilddetektoren in der Röntgendiagnostik" (Surface image detectors in X-ray diagnostics), Der Radiologe 43 (2003), pages 340 to 350.

SUMMARY OF INVENTION

The amount of charge stored in a sensor surface determines the brightness of a pixel (i.e. image point) of the X-ray image. Each sensor surface of the readout array therefore corresponds to one pixel of the X-ray image.

One significant characteristic of an X-ray detector with regard to image quality is that the detector efficiency of the individual sensor surfaces differs to a varying degree. This is manifested in the fact that two sensor surfaces supply pixels of differing brightness, even when they are radiated with the same light intensity. Because of this brightness fluctuation (referred to hereafter as "basic contrast"), the resulting unprocessed X-ray image is of comparatively poor image quality. Local fluctuations in the thickness of the scintillator layer, the dependency of the scintillator layer on radiation quality and lack of homogeneity in the radiated X-ray field also contribute to the intensification of the basic contrast.

It is therefore standard practice to calibrate a digital X-ray detector in order to improve image quality. For this a calibration image is generally recorded at constant X-ray illumination, also referred to as the gain image. This gain image is linked mathematically to the X-ray images recorded later during standard operation of the X-ray detector, so that the basic contrast present in a roughly similar manner in the two images can be at least partially compensated for.

The recording conditions of an X-ray image are characterized by the specific setting of a number of parameters, such as generator voltage, radiation intensity, incident radiation dose, distance between the radiation source and the X-ray detector, in some instances spectral prefiltering of the X-ray radiation, etc.

These parameters in turn influence the basic contrast, so that the compensation achieved by linking the X-ray image to a gain image is merely unsatisfactory in some instances, if the X-ray image and the gain image were recorded with different parameter configurations, i.e. under different recording conditions.

Generally an X-ray device comprising an X-ray detector is provided for a plurality of applications which can for example include the examination of different physical organs in different recording projections at different exposure rates and different exposure times. Each of these applications is subject to an individual parameter configuration.

An object of the invention is to specify a simple, flexible and at the same time precise method for correcting an X-ray image recorded by a digital X-ray detector. A method tailored to the correction method for the precise calibration of the X-ray detector which can be implemented in a comparatively short time will also be specified. Another object of the invention is to specify an X-ray device that is suitable for the implementation of the correction method and the calibration method.

These objects are achieved by the claims.

According to this provision is made, in order to correct an X-ray image recorded by a digital X-ray detector, for selecting at least one gain image from a plurality of stored gain images based on a parameter configuration assigned to the X-ray image which comprises at least one characteristic parameter for the recording conditions of the X-ray image and linking said gain image to the X-ray image. The set of gain images available for selection is created such that all the stored gain images were recorded with different parameter configurations. In other words any two stored gain images differ in the value of at least one parameter. The at least one gain image is hereby selected subject to an appropriately defined distance between the parameter configuration of the X-ray image and the parameter configuration of the gain image within a parameter space set by the parameter(s) used for the selection.

The invention is based on the consideration that the success of the image correction is only ensured, if the gain image was recorded with a parameter configuration which can be compared with the parameter configuration on which the X-ray image to be corrected is based. For optimum image correction therefore the gain image should therefore be recorded under the same conditions as the X-ray image. As every application of the X-ray device provided for is based on an individual parameter configuration, an associated gain image should be produced for every application of the X-ray device. However because of the many standard applications, this would increase the time required unreasonably. The useful life of the X-ray device associated with calibration of the X-ray detector would in practice represent a significant disadvantage and—as gain calibration of the X-ray detector generally has to be carried out not independently by the user but by technical specialists—it would also involve a significant cost. It would therefore be desirable to provide a suitable gain image for every parameter configuration, while at the same time keeping the total number of gain images to be provided as low as possible.

The definition of a parameter space which is set by the parameter(s) used for the selection and the definition of a distance between two parameter configurations within said parameter space, offers a comparatively simple and extremely flexible system for selecting the appropriate gain image or gain images for an X-ray image recorded with any parameter configuration.

The comparatively small number of gain images to be stored in turn has a favorable impact on calibration costs. Also the parameter configuration for an X-ray image to be recorded can be changed in any way or can be added to the parameter configurations generally used, without having to recalibrate the X-ray device.

For particularly flexible image correction, it is advantageous if the stored gain images are retrieved in such a way that the associated parameter configurations scan the parameter space point by point and in its entirety according to a predefined quantization code. The quantization code is for example determined by empirical tests on the X-ray device, to determine that at least one gain image exists in the region of every parameter configuration in the parameter space that can be used for a sufficiently good image correction. The quantization code is in particular tailored to the manner in which a variation in parameter impacts on the basic contrast. The parameter space is scanned for example comparatively closely in the coordinate direction of a parameter, a change to which has a significant impact on the basic contrast. Conversely gain images in the coordinate direction of a parameter which has little impact on the basic contrast, are comparatively widely graduated.

As far as special parameters are concerned, it is particularly expedient for the gain images to be regularly distributed within the parameter space in respect of their parameter configurations. Alternatively provision is made for the distances between the parameter configurations of the stored gain images in the coordinate direction of a parameter to vary according to a predefined mathematical function, particularly with quadratic or logarithmic graduation. Also a quantization code can be used with at least one parameter irregularity.

The parameters setting the parameter space expediently include any combination of at least one of the parameters X-ray spectrum (in turn optionally broken down into generator voltage and spectral prefiltering), radiation dose, and geometric distance between X-ray detector and X-ray radiation source.

In a simple variant of the correction method a single gain image is selected for every X-ray image to be corrected and used for the link to the X-ray image. For linking purposes, the gain image is always selected, the parameter configuration of which is at the smallest distance from the parameter configuration of the X-ray image to be corrected.

In a development of the method however a plurality of gain images adjacent to the parameter configuration of the X-ray image to be corrected is selected. A generic gain image tailored to the X-ray image with regard to parameter configuration is then generated from these selected gain images by interpolation. This generic gain image is then linked to the X-ray image.

A parameter space is determined for calibration of a digital X-ray detector which is defined by at least one characteristic parameter for the recording conditions of an X-ray image. A quantization rule is also predefined for this parameter space. In other words the parameter spaced is subdivided into cells. A grid of parameter configurations, i.e. points in the parameter space, is derived from the quantization rule and an associated gain image is recorded for each of these parameter configurations.

An image processing unit of the X-ray device comprises a memory device, in which a plurality of gain images is stored. The image processing unit also comprises a selection module which is configured to determine the distance between a parameter configuration of an X-ray image to be corrected and the parameter configuration of a stored gain image and to select at least one gain image for linking to the X-ray image based on said distance.

BRIEF DESCRIPTION OF THE DRAWINGS

Exemplary embodiments of the invention are described in more detail below with reference to a drawing, in which.

Corresponding elements and dimensions are assigned the same reference characters in the Figures.

DETAILED DESCRIPTION OF INVENTION

Figure 1:
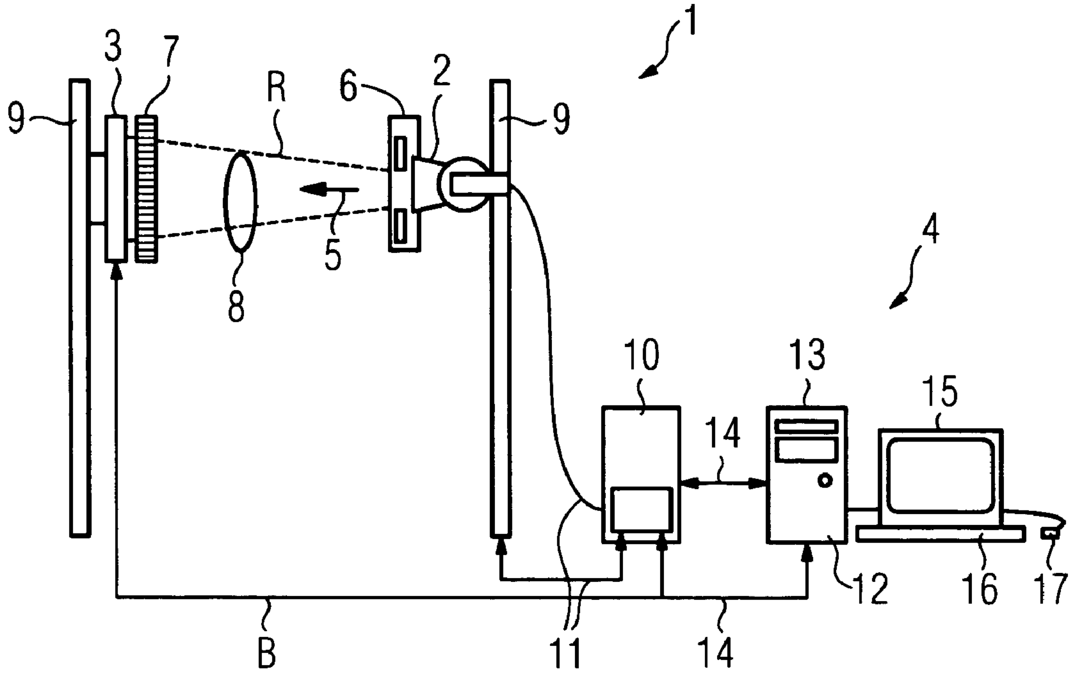
FIG. 1 shows a schematic illustration of an X-ray device with a digital X-ray detector and an image production unit.

The schematically illustrated X-ray device 1 shown in FIG. 1 comprises an X-ray radiation source 2, a digital X-ray detector 3 and a control and evaluation system 4. A collimator 6 and—optionally—a scattered radiation raster 7 are connected between the X-ray radiation source 2 and the X-ray detector 3 in the direction of radiation 5. The collimator 6 here serves to cut a partial bundle of a required size out of the X-ray radiation R generated by the X-ray radiation source 2 which passes through a person 8 to be examined or an object to be examined and through the scattered radiation raster 7 onto the X-ray detector 3. The scattered radiation raster 7 thereby serves to mask out lateral scattered radiation which would falsify the X-ray image recorded by the X-ray detector 3.

The X-ray radiation source 2 and the X-ray detector 3 are mounted in a movable manner on a gantry 9 or above and below an examination table.

The control and evaluation system 4 comprises a control unit 10 to control the X-ray radiation source 2 and/or the X-ray detector 3 and to generate a supply voltage for the X-ray radiation source 2. The control unit 10 is connected via data and supply lines 11 to the X-ray radiation source 2. The control and evaluation system 4 also comprises an image production unit 12 which is preferably a software component of a data processing system 13. The data processing system 13 also contains operating software for the X-ray device 1. The data processing system 13 is connected via data and system bus lines 14 to the control unit 10 and the X-ray detector 3. It is also connected to peripheral devices, in particular a screen 15, a keyboard 16 and a mouse 17 for inputting and outputting data.

Figure 2:
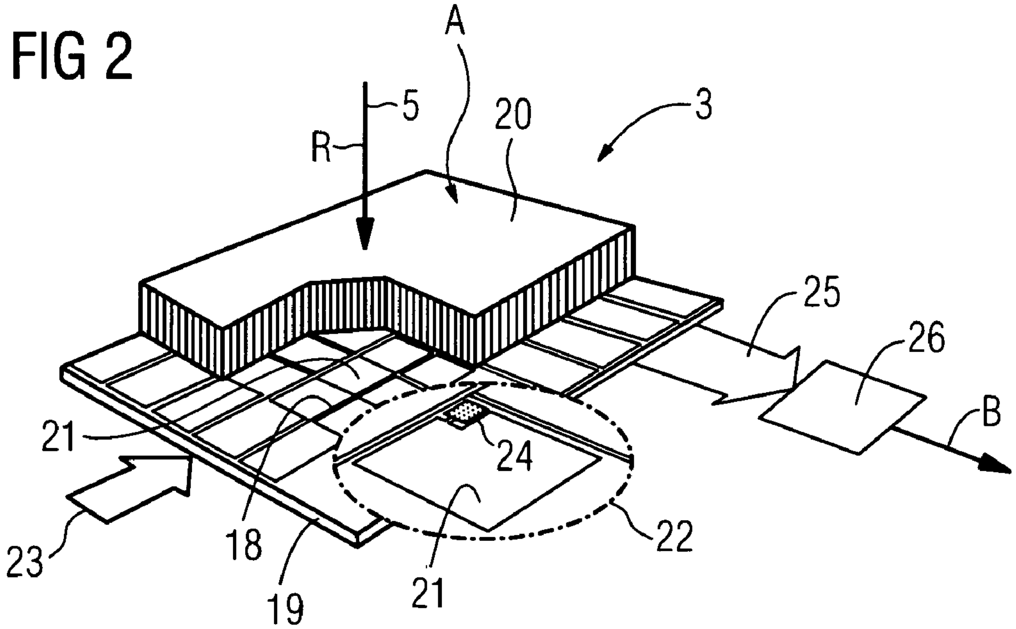
FIG. 2 shows a schematic and perspective view of a partial section of the X-ray detector according to FIG. 1.

The X-ray detector 3 shown in detail in FIG. 2 is a so-called solid-state detector. It comprises a flat active readout array 18 of amorphous silicon (aSi) which is applied to a flat substrate 19. The surface of the readout array 18 is subsequently referred to as the detector surface A. In front of the readout array 18 in turn is a scintillator layer 20 (or converter layer), e.g. of cesium iodide (CsI). In this scintillator layer 20 the incident X-ray radiation R in the direction of radiation 5 is converted to visible light which is converted to electric charge in the sensor surfaces 21 of the readout array 18 configured as photodiodes. This electric charge is in turn stored in the readout array 18 with local resolution. The stored charge can, as shown enlarged in the section 22 in FIG. 2, be read out by electronic activation 23 of a switching element 24 assigned to each sensor surface 21 in the direction of the arrow 25 to an electronic system 26 (only shown in outline). The electronic system 26 generates digital image data B by intensification and analog-digital conversion of the read-out charge. The image data B is transmitted via the data and system bus line 14 to the image production unit 12.

Figure 3:
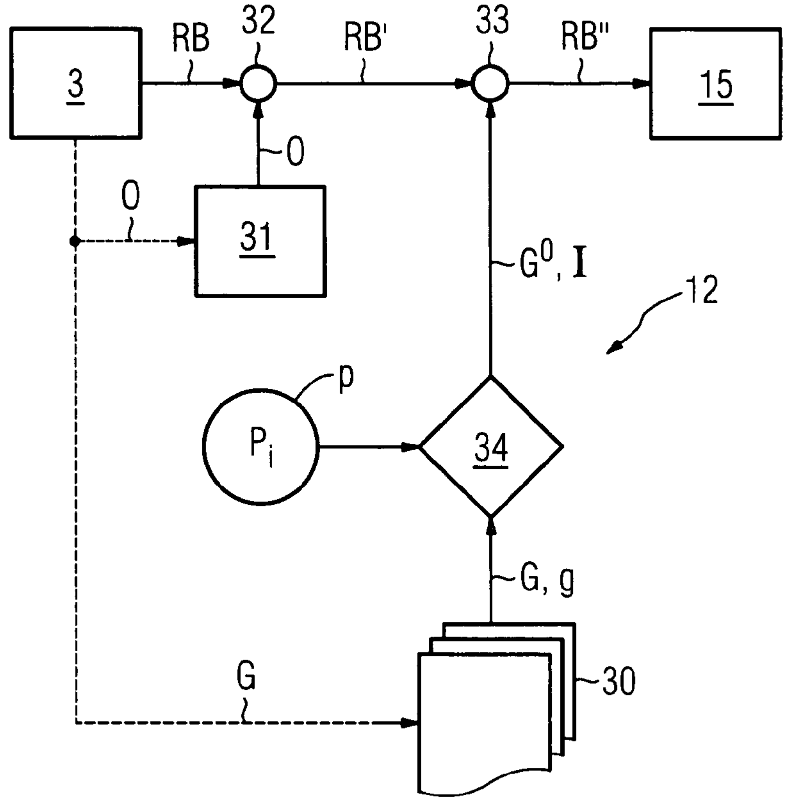
FIG. 3 shows a schematically simplified block diagram of the mode of operation of the image production unit.

The mode of operation of the image production unit 12 is shown in FIG. 3 in a schematic block diagram. A distinction should be made here between a calibration phase and a correction phase. In the calibration phase which precedes routine operation of the X-ray device 1, or which operates in the background to routine operation, calibration data is first collected and stored in the image production unit 12. This calibration data is used in the correction phase to correct the X-ray images RB which are recorded during routine operation of the X-ray device 1.

During the course of calibration, a number of gain images G are recorded using the X-ray detector 3 and stored in a storage module 30 (after an offset correction (not shown in more detail)). Each gain image G is generated in the absence of the person 8 or an object to be examined subject to the same exposure of the X-ray detector 3 to X-ray radiation R. The gain image G therefore reflects the basic contrast caused primarily by the varying detector efficiency of the different sensor surfaces 21.

Offset calibration is also carried out independently of gain calibration. Offset calibration takes into account the fact that an unprocessed X-ray image recorded using the X-ray detector 3 generally also has an irregular “offset brightness” when recorded in the absence of X-ray light. The cause of this is primarily the dark current of the X-ray detector 3 which is always present to a certain degree. There is also residual charge from previous X-ray recordings which was retained in low energy levels (so-called traps) of the detector substrate. The offset brightness is also influenced for example by radiation of the detector surface A with reset light or by application of bias voltages.

To compensate for the offset brightness a so-called offset image O is recorded. Unlike a gain image G, the offset image O is recorded without exposure of the X-ray detector 3, i.e. in the absence of X-ray radiation R. The offset image O is stored in a storage module 31. As the offset brightness has a comparatively fast time-dependency of minutes or a few hours unlike the basic contrast which only changes slowly over time, offset calibration is carried out at short intervals in the background to routine operation of the X-ray device 1, in particular in downtime between two X-ray recordings.

For the purposes of offset correction, every X-ray image RB recorded during routine operation of the X-ray device 1 is fed to a link module 32. The link module 32 links the X-ray image RB to the offset image O stored in the storage module 31, by subtracting the brightness values of the offset image O pixel by pixel from the corresponding brightness values of the X-ray image RB. The offset-corrected X-ray image RB' is then fed to a second link module 33 for the gain correction.

Unlike the offset brightness which mainly depends on parameters that are difficult to influence, such as temperature, the basic contrast depends in a reproducible manner on a number of parameters which can be adjusted during operation of the X-ray device 1. These parameters include in particular the X-ray spectrum which in turn can be influenced by the generator voltage and any spectral prefiltering of the X-ray radiation, the radiation dose and the geometric distance between the X-ray radiation source 2 and the X-ray detector 3.

Each X-ray image RB and each gain image G is therefore characterized by a specific set of parameter settings which existed at the time when the X-ray image RB or gain image G was recorded. This set of parameter settings which characterizes the basic contrast, is referred to as the parameter configuration p of the X-ray image RB or parameter configuration g of the gain image G. The set of gain images G stored in the storage module 30 is created such that the parameter configurations g assigned to the gain images G differ systematically from each other.

In the context of the image production unit 12 a selection module 34 is provided which selects one or a plurality of suitable gain images G for any X-ray image RB and makes said image(s) available for correction of the X-ray image RB. The parameter configuration p of the current X-ray image RB is fed to the link module 34 for the selection.

The selection module 34 always selects the gain image(s) G which is/are particularly close to the X-ray image RB with regard to the parameter configurations g or p. As a measure of this closeness of a gain image G to the X-ray image RB to be corrected, the selection module 34 determines a distance d, between the parameter configuration p of the X-ray image RB and the parameter configuration g of the gain image G within a parameter space 35 which is set by a selection of parameters Pi (i=1,2,3, . . . ,N).

Figure 5:
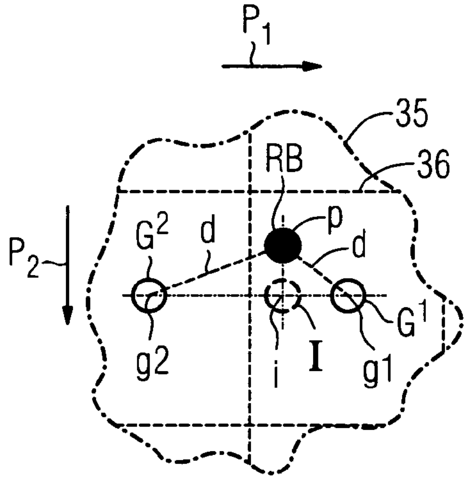

The parameter space 35 shown schematically in FIG. 5 is an N-dimensional, defined mathematical space, in which a coordinate axis is assigned to each parameter Pi. The boundaries of the parameter space 32 are predefined by the technical design of the X-ray device 1.

Figure 4:
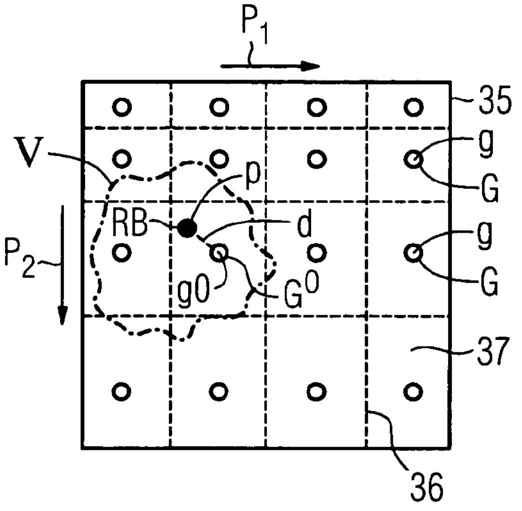
FIG. 4 shows a method for selecting a gain image from a parameter space set by two parameters with reference to a schematic illustration and FIG. 5 an alternative embodiment of the method with reference to a section V of the parameter space according to FIG. 4.

The parameter space 35 shown in FIG. 4 is two-dimensional and is set by the parameters P1 and P2. The parameter P1 is for example the X-ray voltage which varies according to the technical design of the X-ray device 1 from 50 kV to 150 kV. The second parameter P2 is for example the distance between the X-ray radiation source 2 and the X-ray detector 3 which can vary between 1 m and 2 m due to the structure.

Each parameter configuration p, g therefore corresponds to a point in the parameter space 35. The distance between two parameter configurations in this parameter space 35 can be freely determined in the context of the relevant rules for calculating mathematical spaces. An expedient definition of the distance between the parameter configuration p and the parameter configuration g is defined generally by $$d(p,g)=\left(\sum_{i=1}^{N}(f_i(p_i-g_i))^2\right)^{1/2} \qquad \text{GLG 1}$$

pi and gi here represent the ith, i.e. the component of the parameter configuration p or g corresponding to the parameter Pi. fi(pi−gi) here represents a mathematical function of the difference pi−gi suitable for selection. If a change to the parameter Pi has an approximately linear impact on the change in the basic contrast, fi(pi−gi)=pi−gi is expediently used. This reduces GLG 1 to the distance formula known for linear spaces $$d(p,g)=\left(\sum_{i=1}^{N}(p_i-g_i)^2\right)^{1/2} \qquad \text{GLG 2}$$

In order always to ensure a sufficiently good image correction for any parameter configuration, the stored gain images G are distributed over the entire parameter space 35 in a suitable manner in respect of their parameter configurations G.

In order to be able to create such a set of gain images G during calibration, a suitable quantization code 36 is predefined for the parameter space 35, by means of which the parameter space 35 is divided into cells 37. A gain image G is recorded for every cell 37 with a parameter configuration g, which corresponds approximately to the center point of the cell 37.

The parameter configurations g of the gain images G together form a grid which fills the parameter space in its entirety and point by point according to the quantization code 36. The greater the degree to which the change in a parameter Pi changes the basic contrast, the closer the mesh of the grid of the gain images G expediently. The gain images G can—as in FIG. 4 in the direction of the parameter P1—be regularly distributed. Alternatively the distance between adjacent gain images G—as in FIG. 4 in the direction of the parameter P2—can vary according to a mathematical function or in an irregular manner.

In the simple variant of the method implemented by the selection module 34 illustrated in FIG. 4 a single gain image G0 is selected, the parameter configuration g0 of which is at the smallest distance d from the parameter configuration p of the X-ray image RB. This gain image G is fed to the link module 33.

In the link module 33 the brightness values of the X-ray image RB' are divided pixel by pixel by the corresponding brightness values of the selected gain image G0, as a result of which the basic contrast present in a similar manner in the X-ray image RB' and the gain image G0 is compensated for at least partially.

The link module 33 outputs the resulting gain-corrected X-ray image RB" for display on the screen 15 or for further image processing.

According to a development of the method implemented by the selection module 34 illustrated by FIG. 5 two gain images G1 and G2 are selected, the parameter configurations g1 and g2 of which are at the smallest or second smallest distance d from the parameter configuration p of the X-ray image RB.

The selection module 34 uses these selected gain images G1 and G2 in a first step to determine a generic gain image I (corresponding to a generic parameter configuration i) by interpolation, by means of which the basic contrast existing with the parameter configuration p is approximated as closely as possible.

An appropriate formula for creating the generic gain image I is as follows $$I=\eta\cdot G^1+(1-\eta)\cdot G^2 \qquad \text{GLG 3}$$

whereby h is an actual number between 0 and 1 which can be determined by minimizing the distance d(p,i) by i=(g2−g1)xh+g2 and whereby GLG 3 describes the pixel by pixel linking of the brightness values of the gain images I,G1 and G2.

The generic gain image I is fed to the link module 33 and linked as described above to the X-ray image RB'.

In further variants of the method not set out in more detail more than two gain images are selected, from which the generic gain image is generated by multidimensional interpolation.

The invention claimed is:

1. A method of correcting an X-ray image recorded by a digital X-ray detector, comprising:

selecting at least one gain image from a plurality of stored gain images using a first value of at least one selection parameter related to a recording condition of the X-ray image and a distance between a second value of the selection parameter related to a recording condition of the gain image and the first value of the selection parameter in a parameter space defined by the selection parameter; and correlating the selected gain image with the X-ray image, wherein a different first value of the selection parameter corresponds to a different stored gain image.

2. The method according to claim 1, wherein the selection parameter and the parameter space are multidimensional.

3. The method according to claim 1, wherein the recording condition of the X-ray image and the gain image is selected from the, group consisting of brightness, contrast, image definition, focus and image quality.

4. The method according to claim 1, wherein the gain image or gain images are stored based on the second value so that the stored gain images in their entirety cover every point of the parameter space with regard to a quantization rule.

5. The method according to claim 4, wherein the gain image or gain images cover the parameter space at regular intervals with regard to at least one of the selection parameters.

6. The method according to claim 4, wherein the gain image or gain images cover the parameter space at logarithmically varying intervals with regard to at least one of the selection parameters.

7. The method according to claim 1, wherein the selection parameter or selection parameters include an element chosen from the group consisting of an X-ray spectrum, a generator voltage, a spectral pre-filtering, a geometric distance between the X-ray detector and an X-ray radiation source and an X-ray dose.

8. The method according to claim 1, wherein such gain image is selected from the stored gain images whose distance between the second value and the first value is smaller than any distance between the second value related to an other gain image and the first value.

9. The method according to claim 1, further comprising:

selecting a number of gain images adjacent to the X-ray image within the parameter space using the second value parameter; and interpolating between the selected gain images for generating a further gain image tailored to the first value for correlating the further gain image with the X-ray image.

10. A method of calibrating a digital X-ray detector, comprising:

defining a parameter space using at least a first parameter related to a recording condition of an X-ray image;

deriving a grid of parameter configurations covering the parameter space point by point in its entirety using a quantization rule for the parameter space; and recording a gain image for each parameter configuration.

11. An X-ray device, comprising:

a digital X-ray detector; and an image processing unit for correlating an X-ray image recorded by the X-ray detector with a gain image, wherein the image processing unit comprises:

a memory device for storing a plurality of gain images; and a selection module for selecting at least one stored gain image for correlating with the X-ray image using a distance between a first parameter configuration related to the gain image and a second parameter configuration related to the X-ray image within a parameter space defined by at least one parameter related to a recording condition of the X-ray.

* * * * *